United States Patent
Zhou

(10) Patent No.: US 11,604,721 B2
(45) Date of Patent: Mar. 14, 2023

(54) SYSTEM AND METHOD FOR PROCESSING DATA BETWEEN HOST COMPUTER AND CPLD

(71) Applicant: Fulian Precision Electronics (Tianjin) Co., LTD., Tianjin (CN)

(72) Inventor: Xiao-Long Zhou, Tianjin (CN)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 262 days.

(21) Appl. No.: 16/950,726

(22) Filed: Nov. 17, 2020

(65) Prior Publication Data
US 2022/0058111 A1    Feb. 24, 2022

(30) Foreign Application Priority Data

Aug. 20, 2020    (CN) .......................... 202010845892.0

(51) Int. Cl.
*G06F 11/22* (2006.01)
*G06F 11/36* (2006.01)
*G06F 11/32* (2006.01)

(52) U.S. Cl.
CPC ...... *G06F 11/3656* (2013.01); *G06F 11/2205* (2013.01); *G06F 11/321* (2013.01); *G06F 11/324* (2013.01); *G06F 11/3652* (2013.01)

(58) Field of Classification Search
CPC .. G06F 11/2205; G06F 11/221; G06F 11/263; G06F 11/273; G06F 11/27; G06F 9/3863; G01R 31/31705; G01R 31/31835; G01R 31/318544; G01R 31/28; G05B 2219/33297
See application file for complete search history.

(56) References Cited

U.S. PATENT DOCUMENTS

| | | | |
|---|---|---|---|
| 7,012,815 B2 * | 3/2006 | Garnett | H05K 7/1425 361/679.48 |
| 2011/0010720 A1 * | 1/2011 | Smith | G06Q 10/06 712/E9.016 |
| 2013/0151899 A1 | 6/2013 | Wang | |
| 2015/0324266 A1 * | 11/2015 | Zhang | G06F 11/263 714/32 |
| 2016/0139201 A1 * | 5/2016 | Lin | G01R 31/31705 714/727 |
| 2019/0138369 A1 * | 5/2019 | Lambert | H04L 41/0645 |

FOREIGN PATENT DOCUMENTS

| | | | |
|---|---|---|---|
| CN | 101989219 A | * | 3/2011 |
| CN | 107656856 A | | 2/2018 |
| CN | 114385544 A | * | 4/2022 |
| TW | 201324134 A1 | | 6/2013 |

* cited by examiner

*Primary Examiner* — Yolanda L Wilson
(74) *Attorney, Agent, or Firm* — ScienBiziP, P.C.

(57) ABSTRACT

A method for processing data between host computer and CPLD provides a host computer, a circuit board comprising a UART unit, a pre-debugged hardware, and a CPLD. The UART unit communicates with the host computer via UART. The method further provides the CPLD coupled between the UART unit and the pre-debugged hardware and allows the CPLD to receive data from the host computer via the UART unit and to analyze the data. According to the method, the CPLD debugs the pre-debugged hardware according to the analyzed data and obtains a result of debugging. The CPLD outputs the result and allows the CPLD to transmit the result to the host computer via the UART unit. A system using the method is also provided.

16 Claims, 4 Drawing Sheets

SYSTEM AND METHOD FOR PROCESSING DATA BETWEEN HOST COMPUTER AND CPLD

FIELD

The disclosure relates to communications, and more particularly, to a system and a method for processing data between a host computer and CPLD.

BACKGROUND

Many chips have fixed the UART (Universal Asynchronous Receiver/Transmitter) interface to communicate with a host computer. However, some CPLDs (Complex Programmable Logic Devices) do not have a fixed UART interface. To directly debug registers in the CPLD and peripheral hardware of the CPLD, manual operation is needed to control a debug device, for example, a jumper, or a debug switch, or the like. Remote operation can be employed to debug the hardware, but the remote operation requires a software driver.

BRIEF DESCRIPTION OF THE DRAWINGS

Implementations of the present disclosure will now be described, by the way of embodiments, with reference to the attached figures.

Implementations of the disclosure are described with reference to the drawings.

DETAILED DESCRIPTION

Implementations of the disclosure are described, by the way of embodiments only, with reference to the drawings. The disclosure is illustratively only, and changes may be made in the detail within the principles of the present disclosure.

Unless otherwise defined, all technical terms used herein have the same meaning as commonly understood by one of ordinary skill in the art. The technical terms used herein are not to be considered as limiting the scope of the embodiments.

Implementations of the disclosure will now be described, by the way of embodiments only, with reference to the drawings. It should be noted that non-conflicting details and features in the embodiments of the present disclosure may be combined with each other.

Figure 1:
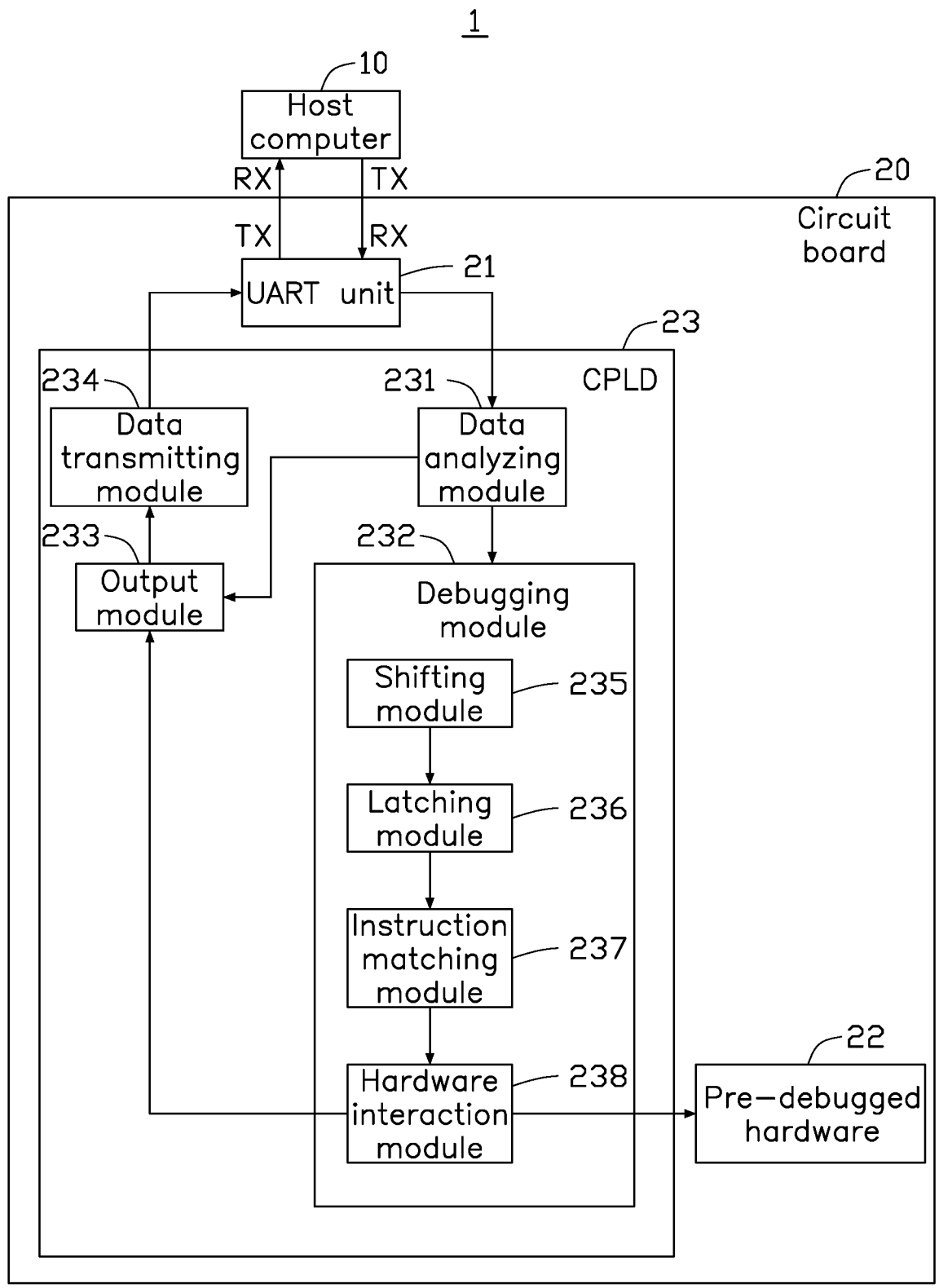
FIG. 1 is a block diagram of a system for processing data between a host computer and CPLD.

Referring to FIG. 1, FIG. 1 is a block diagram of a system for processing data between a host computer and CPLD. The system for processing data between a host computer and CPLD 1 (hereinafter system 1) includes a host computer 10 and a circuit board 20. The host computer 10 generates data and transmits the data to the circuit board 20. The data can be data in ASCII code, for example, characters such as "A", "o", or the like. The circuit board 20 includes a UART unit 21, a pre-debugged hardware 22, and a CPLD 23. The UART unit 21 communicates with the host computer 10. In the embodiment, the UART unit 21 is coupled to the host computer 10 by two data lines. The host computer 10 transmits data via one data line, namely, the host computer 10 performs a TX operation. The host computer 10 receives data via the other data line, namely, the host computer 10 performs an RX operation. The UART unit 21 receives data via the one data line, namely, the UART unit 21 performs an RX operation. The UART unit 21 transmits data via the other data line, namely, the UART unit 21 performs a TX operation.

The CPLD 23 is coupled to the UART unit 21 and the pre-debugged hardware 22. In the embodiment, the CPLD 23 is coupled to the UART unit 21 via two signal lines. The UART unit 21 is further coupled to the circuit board 20 via a power source line and a ground line. The CPLD 23 includes a data analyzing module 231, a debugging module 232, an output module 233, and a data transmitting module 234. The data analyzing module 231 receives data from the host computer 10 via the UART unit 21 and analyzes the data. In the embodiment, the data analyzing module 231 receives data from the host computer 10 via the UART unit 21 and one signal line of the two signal lines and analyzes the data. In the embodiment, the system analyzes the data in ASCII code and converts the same to hexadecimal data, for example, hexadecimal data "OX10". In another embodiment, the system analyzes the data in ASCII code and converts to other data, for example, decimal data, octal data, binary data, or the like. The debugging module 232 debugs the pre-debugged hardware 22 according to the analyzed data to obtain a result of debugging. The output module 233 is configured to output the result of debugging. The data transmitting module 234 is configured to transmit the result to the host computer 10 via the UART unit 21. In the embodiment, the data transmitting module 234 transmits the result to the host computer 10 via the UART unit 21 and the other signal line of the two signal lines.

In the embodiment, the output module 233 is further configured to output the analyzed data. The data transmitting module 234 is further configured to transmit the analyzed data to the host computer 10 via the UART unit 21. Thus, when an operator transmits character "A" from the host computer 10 to the CPLD 23, the CPLD 23 returns data to the host computer 10 to cause the host computer 10 to display the character "A". Thereby, the operator can know the operation which he carried out on the host computer 10 and the result.

In the embodiment, the debugging module 232 includes a shifting module 235. The shifting module 235 is configured to determine a type of the analyzed data and perform at least one of a group of writing data into a buffer of the CPLD 23, deleting data from the buffer of the CPLD 23, stopping the writing of data into the buffer of the CPLD 23, and shifting data in the buffer of the CPLD 23, until the type of the analyzed data is a carriage return character according to the type of the analyzed data.

In detail, the shifting module 235 is configured to determine the type of the analyzed data. If the analyzed data represents a number or a letter of the alphabet, the shifting module 235 determines that the type of the analyzed data is a general character. If the analyzed data represent space, the shifting module 235 determines that the type of the analyzed data is a null character. If the analyzed data represent a backspace, the shifting module 235 determines that the type of the analyzed data is a backspace character. If the analyzed data is an enter (a start operation), the shifting module 235 determines that the type of the analyzed data is an enter character.

If the type of the analyzed data is a general character, the shifting module 235 is further configured to shift all the data in the buffer of the CPLD 23 to the left by one byte and write the analyzed data in a lowest-address byte (least significant byte) of the buffer of the CPLD 23.

If the type of the analyzed data is the null character, the shifting module 235 is further configured to determine whether a type of an immediately previous analyzed data is the null character. If the type of the immediately previous analyzed data is the null character, the shifting module 235 is further configured to stop writing of data into the buffer of the CPLD 23. If the type of the immediately previous analyzed data is not the null character, the shifting module 235 is further configured to shift all the data in the buffer of the CPLD 23 to the left by one byte and write the analyzed data in the lowest-address byte of the buffer of the CPLD 23.

If the type of the analyzed data is the backspace character, the shifting module 235 is further configured to stop writing of data into the buffer of the CPLD 23, delete data from the lowest-address byte of the buffer of the CPLD 23, and shift all the data in the buffer of the CPLD 23 to the right by one byte.

In the embodiment, the shifting module 235 is further configured to determine whether the type of the analyzed data is the general character. If the type of the analyzed data is determined to not be the general character, the shifting module 235 is further configured to determine whether the type of the analyzed data is the null character. If the type of the analyzed data is determined to not be the null character, the shifting module 235 is further configured to determine whether the type of the analyzed data is the backspace character. If the type of the analyzed data is determined to not be the backspace character, the shifting module 235 is further configured to determine whether the type of the analyzed data is the enter character. Obviously, the sequence of determining the general character, determining the null character, and determining the backspace character can vary, for example, can vary from another sequence of determining the general character, determining the backspace character, and determining the null character, or determining the backspace character, determining the general character, and determining the null character, or the like.

In the embodiment, the debugging module 232 further includes a latching module 236. The latching module 236 is configured to latch all the data in the buffer of the CPLD 23 if the type of the analyzed data is the enter character. In the embodiment, the latching module 236 is further configured to shift the latched data in the buffer of the CPLD 23 to the left until the highest-address byte of the buffer of the CPLD 23 is not null.

In the embodiment, the debugging module 232 further includes an instruction matching module 237 and a hardware interaction module 238. The instruction matching module 237 is configured to determine a type of instruction according to the latched data in the buffer of the CPLD 23 and a preset instruction database. In detail, the instruction matching module 237 is configured to determine whether the shifted and latched data in the buffer of the CPLD 23 matches with a target instruction of the preset instruction database to determine the type of the instruction. If the shifted and latched data in the buffer of the CPLD 23 matches with a target instruction of the preset instruction database, the instruction matching module 237 determines that the type of the instruction is the target instruction. For example, if the shifted and latched data in the buffer of the CPLD 23 matches with an instruction to read data in register 1-10, the instruction matching module 237 determines that the type of the instruction is the instruction to read data in register 1-10. In the embodiment, the type of the instruction includes an instruction to read data and an instruction to control hardware. The instruction to read data includes an instruction to read data in register 1-2, an instruction to read data in register 2-5, and so on. The instruction to control hardware includes an instruction to control a hardware E, an instruction to control a hardware F, and so on. The hardware interaction module 238 is configured to debug the pre-debugged hardware 22 according to the type of the instruction to obtain the result of debugging.

In the embodiment, the debugging module 232 is further configured to indicate an error by prompt if the type of the instruction of the shifted and latched data is null. In detail, the instruction matching module 237 is further configured to determine that the type of the instruction of the shifted and latched data is null if the shifted and latched data in the buffer of the CPLD 23 does not match with any instruction of the preset instruction database. The hardware interaction module 238 is further configured to generate the error prompt according to the null type of the instruction of the shifted and latched data. The output module 233 is further configured to output the error prompt. The data transmitting module 234 is configured to transmit the error prompt to the host computer 10 via the UART unit 21.

Figure 2:
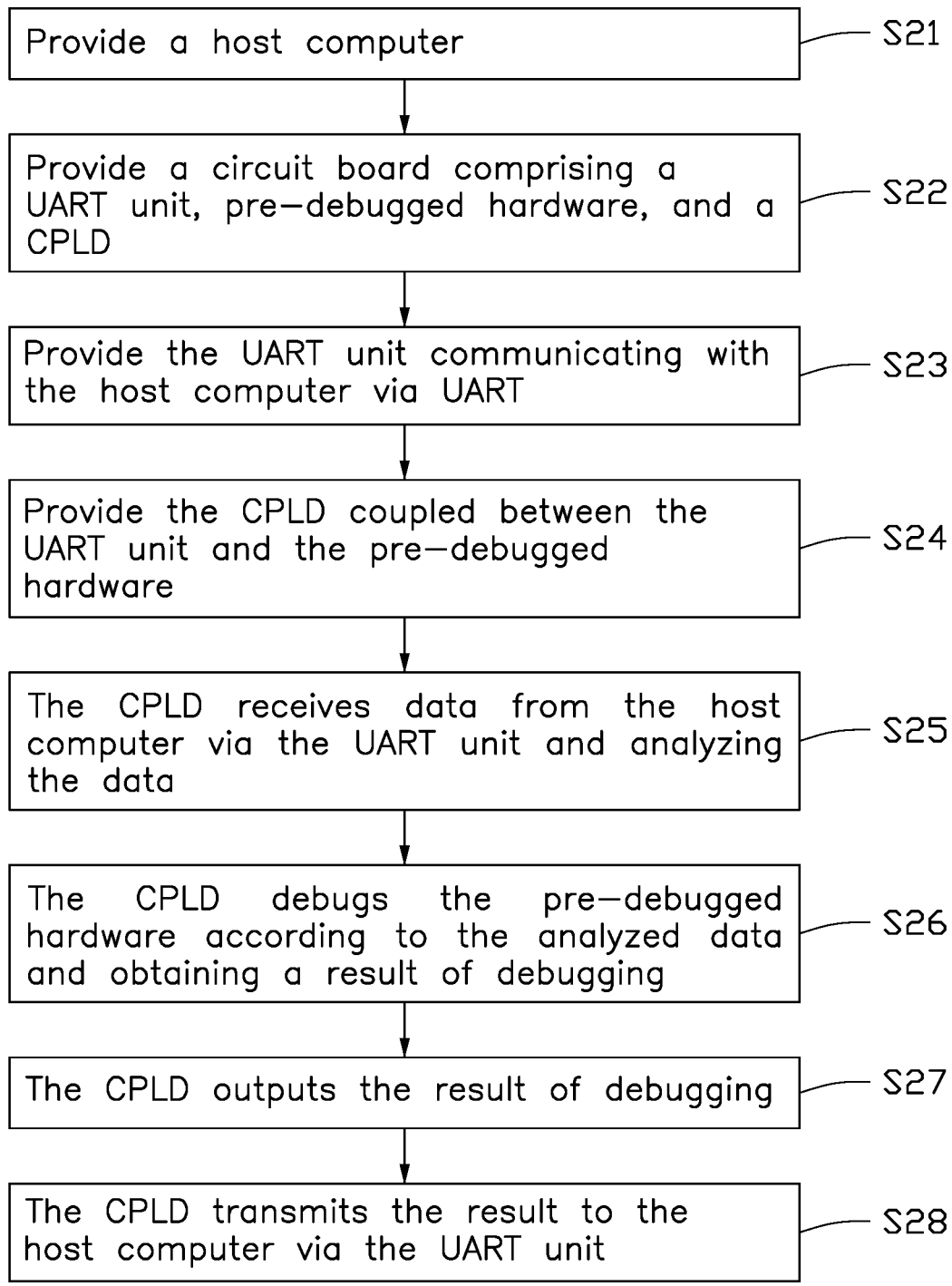
FIG. 2 is a flowchart of a method for processing data between a host computer and CPLD.

Referring to FIG. 2, a flowchart of a method for processing data between a host computer and CPLD is shown. The method for processing data between a host computer and CPLD (hereinafter the method) is applied in the system of FIG. 1. The method can include the following:

At step S21, providing a host computer.

At step S22, providing a circuit board comprising a UART unit, pre-debugged hardware, and a CPLD.

At step S23, providing the UART unit communicating with the host computer via UART.

At step S24, providing the CPLD coupled between the UART unit and the pre-debugged hardware.

At step S25, the CPLD receives data from the host computer via the UART unit and analyzing the data.

At step S26, the CPLD debugs the pre-debugged hardware according to the analyzed data and obtaining a result of debugging.

At step S27, the CPLD outputs the result of debugging.

At step S28, the CPLD transmits the result to the host computer via the UART unit.

In the embodiment, the method further includes that the CPLD receives data in ASCII code from the host computer via the UART unit and analyzing and converting the data in ASCII code to hexadecimal data.

In the embodiment, the method further includes a step a1 and a step a2. The step a1 includes that the CPLD outputs the analyzed data. The step a2 includes that the CPLD transmits the analyzed data to the host computer via the UART unit.

Figure 3:
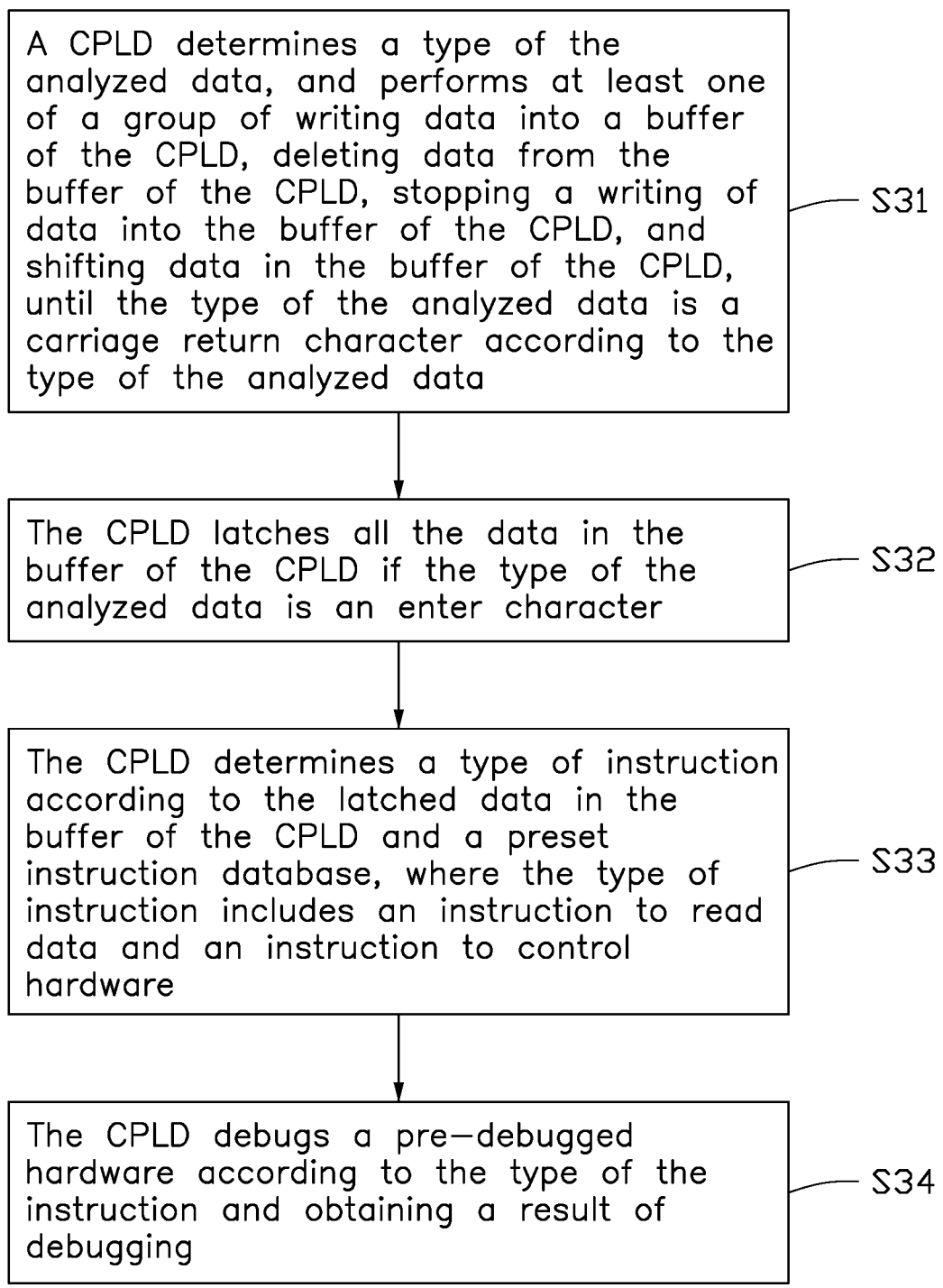
FIG. 3 is a flowchart illustrating and describing a process for the CPLD debugging pre-debugged hardware according to an analyzed data and obtaining a result of debugging according to the method of FIG. 2.

Referring to FIG. 3, a flowchart illustrating and describing a process for the CPLD debugging the pre-debugged hardware according to the analyzed data and obtaining a result of debugging (see FIG. 2) is shown. In the embodiment, the process for the CPLD debugging the pre-debugged hardware according to the analyzed data and obtaining a result of debugging can include:

At step S31, the CPLD determines a type of the analyzed data, and performs at least one of a group of writing data into a buffer of the CPLD, deleting data from the buffer of the CPLD, stopping a writing of data into the buffer of the CPLD, and shifting data in the buffer of the CPLD, until the type of the analyzed data is a carriage return character according to the type of the analyzed data.

At step S32, the CPLD latches all the data in the buffer of the CPLD if the type of the analyzed data is the enter character.

At step S33, the CPLD determines a type of instruction according to the latched data in the buffer of the CPLD and a preset instruction database, where the type of instruction includes an instruction to read data and an instruction to control hardware.

At step S34, the CPLD debugs the pre-debugged hardware according to the type of the instruction and obtains the result of debugging.

Figure 4:
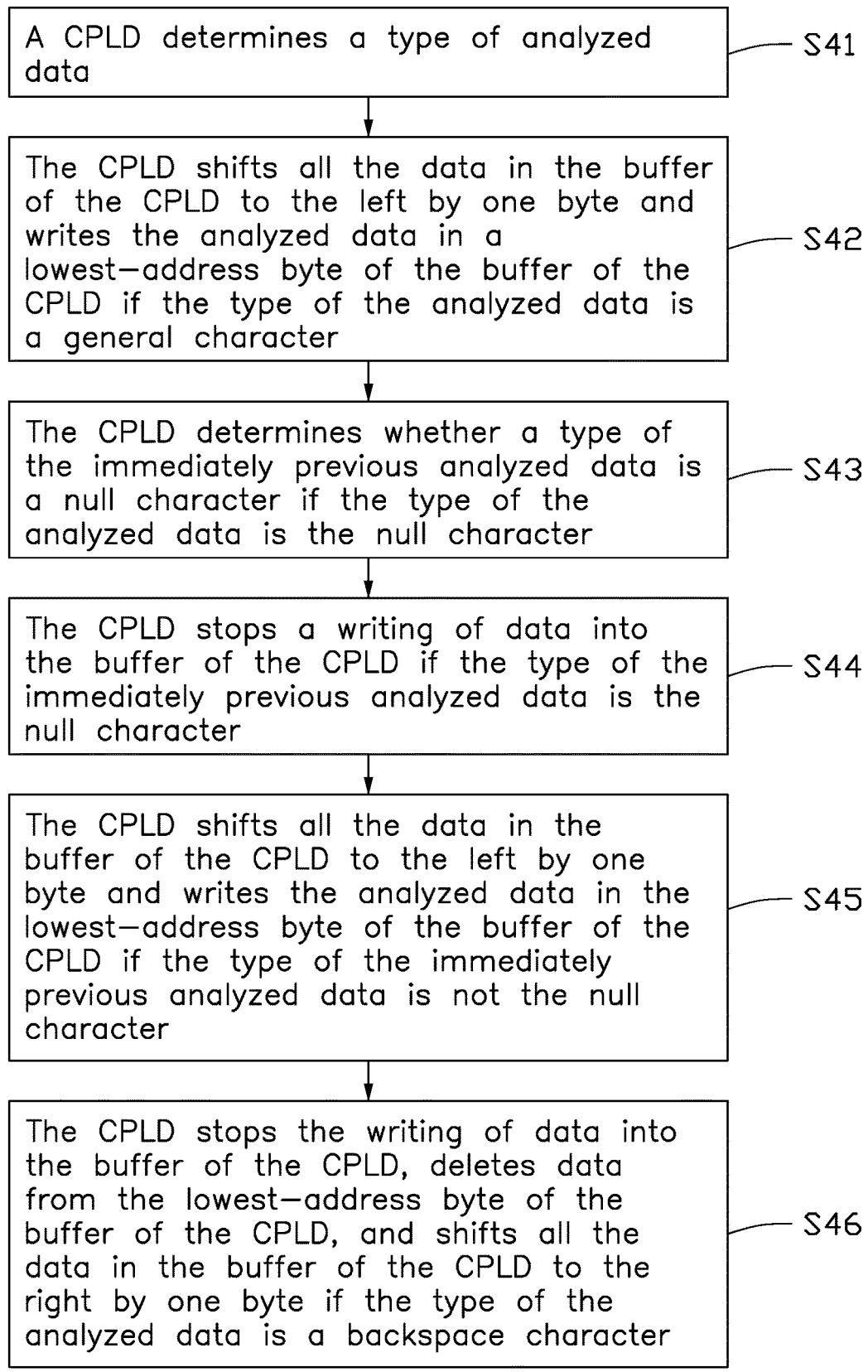
FIG. 4 is a flowchart illustrating and describing a process for the CPLD determining a type of the analyzed data, and performing at least one of a group of writing data into a buffer of the CPLD, deleting data from the buffer of the CPLD, ceasing the writing of data into the buffer of the CPLD, and shifting data in the buffer of the CPLD until the type of the analyzed data is a carriage return character according to the type of the analyzed data of FIG. 3.

Referring to FIG. 4, a flowchart illustrating and describing a process for the CPLD determining a type of the analyzed data, and performing at least one of a group of writing data into a buffer of the CPLD, deleting data from the buffer of the CPLD, ceasing the writing of data into the buffer of the CPLD, and shifting data in the buffer of the CPLD until the type of the analyzed data is a carriage return character is shown. In the embodiment, the process for the CPLD determining a type of the analyzed data, and performing at least one of a group of writing data into a buffer of the CPLD, deleting data from the buffer of the CPLD, stopping a writing of data into the buffer of the CPLD, and shifting data in the buffer of the CPLD until the type of the analyzed data is a carriage return character can include:

At step S41, the CPLD determines the type of the analyzed data.

At step S42, the CPLD shifts all the data in the buffer of the CPLD to the left by one byte and writes the analyzed data in a lowest-address byte of the buffer of the CPLD if the type of the analyzed data is a general character.

At step S43, the CPLD determines whether a type of the immediately previous analyzed data is a null character if the type of the analyzed data is the null character.

At step S44, the CPLD stops a writing of data into the buffer of the CPLD if the type of the immediately previous analyzed data is the null character.

At step S45, the CPLD shifts all the data in the buffer of the CPLD to the left by one byte and writes the analyzed data in the lowest-address byte of the buffer of the CPLD if the type of the immediately previous analyzed data is not the null character.

At step S46, the CPLD stops the writing of data into the buffer of the CPLD, deletes data from the lowest-address byte of the buffer of the CPLD, and shifts all the data in the buffer of the CPLD to the right by one byte if the type of the analyzed data is a backspace character.

Obviously, variations can be included in the method. Such variations can refer to a detailed description of the system and are not described herein.

The CPLD of the disclosure communicates with the host computer via the UART unit of the circuit board, receives data from the host computer via the UART unit, analyzes the data, debugs the pre-debugged hardware according to the analyzed data, obtains the result of debugging, outputs the result, and transmits the result to the host computer via the UART unit. Thus, the CPLD of the disclosure can debug the pre-debugged hardware via the UART unit of the circuit board even if the CPLD does not have a fixed UART unit and in addition, does not rely on any software driver.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A system for processing data between host computer and complex programmable logic device comprising:
   a host computer;
   a circuit board, the circuit board comprising:
      a UART unit, the UART unit communicating with the host computer via UART;
      a pre-debugged hardware;
      a complex programmable logic device, the complex programmable logic device coupled between the UART unit and the pre-debugged hardware, the complex programmable logic device is configured to:
      receive data from the host computer via the UART unit and analyze the data;
      debug the pre-debugged hardware according to the analyzed data to obtain a result of debugging;
      output the result of debugging;
      transmit the result of debugging to the host computer via the UART unit;
   wherein the complex programmable logic device is further configured to:
   receive data in ASCII code from the host computer via the UART unit and analyze the data in ASCII code and convert same to hexadecimal data.

2. The system according to claim 1, wherein the complex programmable logic device is further configured to:
   output the analyzed data;
   transmit the analyzed data to the host computer via the UART unit.

3. The system according to claim 1, wherein the complex programmable logic device is further configured to:
   determine a type of the analyzed data, and perform at least one of a group of writing data into a buffer of the complex programmable logic device, deleting data from the buffer of the complex programmable logic device, stopping a writing of data into the buffer of the complex programmable logic device, and shifting data in the buffer of the complex programmable logic device until the type of the analyzed data is a carriage return character according to the type of the analyzed data.

4. The system according to claim 3, wherein the complex programmable logic device is further configured to:
   shift all the data in the buffer of the complex programmable logic device to the left by one byte and write the analyzed data in a lowest-address byte of the buffer of the complex programmable logic device if the type of the analyzed data is a general character.

5. The system according to claim 3, wherein the complex programmable logic device is further configured to:
   determine whether a type of an immediately previous analyzed data is the null character if the type of the analyzed data is a null character;

stop the writing of data into the buffer of the complex programmable logic device if the type of the immediately previous analyzed data is the null character;

shift all the data in the buffer of the complex programmable logic device to the left by one byte and write the analyzed data in a lowest-address byte of the buffer of the complex programmable logic device if the type of the immediately previous analyzed data is not null character.

6. The system according to claim 3, wherein the complex programmable logic device is further configured to:

stop the writing of data into the buffer of the complex programmable logic device, delete data from a lowest-address byte of the buffer of the complex programmable logic device, and shift all the data in the buffer of the complex programmable logic device to the right by one byte if the type of the analyzed data is a backspace character.

7. The system according to claim 3, wherein the complex programmable logic device is further configured to:

latch all the data in the buffer of the complex programmable logic device if the type of the analyzed data is an enter character.

8. The system according to claim 7, wherein the complex programmable logic device is further configured to:

determine a type of instruction according to the latched data in the buffer of the complex programmable logic device and a preset instruction database; where the type of the instruction comprises an instruction to read data and an instruction to control hardware;

debug the pre-debugged hardware according to the type of the instruction to obtain the result of debugging.

9. A method for processing data between host computer and complex programmable logic device comprising:

providing a host computer;

providing a circuit board comprising a UART unit, a pre-debugged hardware, and a complex programmable logic device;

providing the UART unit communicating with the host computer via UART;

providing the complex programmable logic device being coupled between the UART unit and the pre-debugged hardware;

the complex programmable logic device receiving data from the host computer via the UART unit and analyzing the data;

the complex programmable logic device debugging the pre-debugged hardware according to the analyzed data to obtain a result of debugging;

the complex programmable logic device outputting the result of debugging;

the complex programmable logic device transmitting the result of debugging to the host computer via the UART unit;

the method further comprises:

the complex programmable logic device receiving data in ASCII code from the host computer via the UART unit and analyzing the data in ASCII code and converting same to hexadecimal data.

10. The method according to claim 9, wherein the method further comprises:

the complex programmable logic device outputting the analyzed data;

the complex programmable logic device transmitting the analyzed data to the host computer via the UART unit.

11. The method according to claim 9, wherein the method further comprises:

the complex programmable logic device determining a type of the analyzed data, and performing at least one of a group of writing data into a buffer of the complex programmable logic device, deleting data from the buffer of the complex programmable logic device, stopping a writing of data into the buffer of the complex programmable logic device, and shifting data in the buffer of the complex programmable logic device until the type of the analyzed data is a carriage return character according to the type of the analyzed data.

12. The method according to claim 11, wherein the method further comprises:

the complex programmable logic device shifting all the data in the buffer of the complex programmable logic device to the left by one byte and writing the analyzed data in a lowest-address byte of the buffer of the complex programmable logic device if the type of the analyzed data is a general character.

13. The method according to claim 11, wherein the method further comprises:

the complex programmable logic device determining whether a type of an immediately previous analyzed data is a null character if the type of the analyzed data is the null character;

the complex programmable logic device stopping the writing of data into the buffer of the complex programmable logic device if the type of the immediately previous analyzed data is the null character;

the complex programmable logic device shifting all the data in the buffer of the complex programmable logic device to the left by one byte and writing the analyzed data in a lowest-address byte of the buffer of the complex programmable logic device if the type of the immediately previous analyzed data is not null character.

14. The method according to claim 11, wherein the method further comprises:

the complex programmable logic device stopping the writing of data into the buffer of the complex programmable logic device, deleting data from a lowest-address byte of the buffer of the complex programmable logic device, and shifting all the data in the buffer of the complex programmable logic device to the right by one byte if the type of the analyzed data is a backspace character.

15. The method according to claim 11, wherein the method further comprises:

the complex programmable logic device latching all the data in the buffer of the complex programmable logic device if the type of the analyzed data is an enter character.

16. The method according to claim 15, wherein the method further comprises:

the complex programmable logic device determining a type of instruction according to the latched data in the buffer of the complex programmable logic device and a preset instruction database; where the type of the instruction comprises an instruction to read data and an instruction to control hardware;

the complex programmable logic device debugging the pre-debugged hardware according to the type of the instruction to obtain the result of debugging.

* * * * *